United States Patent [19]

Stanford et al.

[11] Patent Number: 5,513,298
[45] Date of Patent: Apr. 30, 1996

[54] INSTANTANEOUS CONTEXT SWITCHING FOR SPEECH RECOGNITION SYSTEMS

[75] Inventors: Vince M. Stanford, Gaithersburg; Alice G. Klein; Norman F. Brickman, both of Potomac, all of Md.

[73] Assignee: International Business Machines Corporation, Armonk, N.Y.

[21] Appl. No.: 443,685

[22] Filed: May 18, 1995

Related U.S. Application Data

[63] Continuation of Ser. No. 947,634, Sep. 21, 1992, abandoned.

[51] Int. Cl.$^6$ .................................................. G10L 9/00
[52] U.S. Cl. ...................... 395/2.52; 395/2.54; 395/2.84
[58] Field of Search ............................ 395/2, 2.4, 2.52, 395/2.55, 2.6, 2.65, 2.79, 2.82, 2.84; 381/41–43

[56] References Cited

U.S. PATENT DOCUMENTS

| | | | |
|---|---|---|---|
| 4,069,393 | 1/1978 | Martin et al. | 395/2 |
| 4,087,630 | 5/1978 | Browning et al. | 395/2.45 |
| 4,144,582 | 3/1979 | Hyatt | 395/2.84 |
| 4,461,024 | 7/1984 | Rengger et al. | 395/2.42 |
| 4,481,593 | 11/1984 | Bahler | 395/2.66 |
| 4,489,435 | 12/1984 | Moshier | 395/2.66 |
| 4,718,088 | 1/1988 | Baker et al. | 395/2 |
| 4,720,802 | 1/1988 | Damoulakis et al. | 395/2.42 |
| 4,783,803 | 11/1988 | Baker et al. | 381/43 |
| 4,805,218 | 2/1989 | Bamberg et al. | 395/2.5 |
| 4,829,572 | 5/1989 | Kong | 395/2.63 |
| 4,856,066 | 8/1989 | Lemelson | 395/2.84 |
| 4,897,878 | 1/1990 | Boll et al. | 395/2.42 |
| 4,905,286 | 2/1990 | Sedgwick et al. | 395/2.42 |
| 4,922,538 | 5/1990 | Tchorzewski | 395/2.84 |
| 4,933,973 | 6/1990 | Porter | 381/43 |
| 4,961,229 | 10/1990 | Takahashi | 395/2.82 |
| 5,027,406 | 6/1991 | Roberts et al. | 395/2 |
| 5,036,538 | 7/1991 | Oken et al. | 395/2.42 |
| 5,054,082 | 10/1991 | Smith et al. | 395/2.84 |
| 5,212,730 | 5/1993 | Wheatley et al. | 395/2.52 |
| 5,265,191 | 11/1993 | McNair | 395/2.84 |
| 5,317,673 | 5/1994 | Cohen et al. | 395/2.41 |
| 5,355,433 | 10/1994 | Yasuda et al. | 395/2.52 |
| 5,390,278 | 2/1995 | Gupta et al. | 395/2.52 |
| 5,425,129 | 6/1995 | Garman et al. | 395/2.65 |

FOREIGN PATENT DOCUMENTS

| | | |
|---|---|---|
| 215573 | 8/1985 | European Pat. Off. . |
| 2-274048 | 11/1990 | Japan . |

OTHER PUBLICATIONS

K.-F. Lee, "Context-Dependent Phonetic Hidden Markov Models for Speaker-Independent Continuous Speech Recognition," IEEE Transactions on Acoustics, Speech, and Signal Processing, v. 38, No. 4, Apr. 1990, pp. 599–609.

IEEE Article by K. F. Lee & H. W. Hon, "Large Vocabulary Speaker Independent Continuous Speech Recognition Using HMM, " 1988, pp. 123–126, (CH2561-9/88/00000-0123).

Schmandt et al., "Augmenting a Window System with Speech Input, " Computer, 23(8):50–56, Aug. 1990.

*Primary Examiner*—Allen R. MacDonald
*Assistant Examiner*—Michael A. Sartori
*Attorney, Agent, or Firm*—Paul T. Kashimba; Martin J. McKinley; Joseph C. Redmond, Jr.

[57] ABSTRACT

An instantaneous context switching speech recognition system is disclosed which enables a speech recognition application to be changed without loading new pattern matching data into the system. Selectable pointer maps are included in the memory of the system which selectively change the relationship between words and phonemes between a first application context and the pattern matching logic to a second application context and the pattern matching logic.

19 Claims, 3 Drawing Sheets

INSTANTANEOUS CONTEXT SWITCHING FOR SPEECH RECOGNITION SYSTEMS

This application is a continuation of Ser. No. 07/947,634, filed on Sep. 21, 1992, and now abandoned.

BACKGROUND OF THE INVENTION

This invention relates adapting a speech recognition system to be capable of dealing with a plurality of speech recognition contexts in an efficient manner.

Speech recognition systems are well known to the art. Examples include the IBM Tangora [10] and Dragon Systems Dragon 30 k dictation systems. Typically, they are single user, and speaker-dependent. This requires each speaker to train the speech recognizer with his or her voice patterns, during a process called "enrollment". The systems then maintain a profile for each speaker, who must identify themselves to the system in future recognition sessions. Typically speakers enroll via a local microphone in a low noise environment, speaking to the single machine on which the recognizer is resident. During the course of enrollment, the speaker will be required to read a lengthy set of transcripts, so that the system can adjust itself to the peculiarities of each particular speaker.

Discrete dictation systems, such as the two mentioned above, require speakers to form each word in a halting and unnatural manner, pausing, between, each, word. This allows the speech recognizer to identify the voice pattern associated each individual word by using preceding, and following, silences to bound the words. The speech recognizer will typically have a single application for which it is trained, operating on the single machine, such as Office Correspondence in the case of the IBM Tangora System.

Multi-user environments with speaker dependent speech recognizers require each speaker to undertake tedious training of the recognizer for it to understand his or her voice patterns. While it has been suggested that the templates which store the voice patterns may be located in a common database wherein the system knows which template to use for a speech recognition by the speaker telephone extension, each speaker must none-the-less train the system before use. A user new to the system calling from an outside telephone line will find this procedure to be unacceptable. Also, the successful telephonic speech recognizer will be capable of rapid context switches to allow speech related to various subject areas to be accurately recognized. For example, a system trained for general Office Correspondence will perform poorly when presented with strings of digits.

The Sphinx system, first described in the Ph.D. Dissertation of Kai-Fu Lee [1], represented a major advance over previous speaker-dependent recognition systems in that it was both speaker independent, and capable of recognizing words from a continuous stream of conversational speech. This system required no individualized speaker enrollment prior to effective use. Some speaker dependent systems require speakers to be reenrolled every four to six weeks, and require users to carry a personalized plug-in cartridge to be understood by the system. Also with continuous speech recognition, no pauses between words are required, thus the Sphinx system represents a much more user friendly approach to the casual user of a speech recognition system. This will be an essential feature of telephonic speech recognition systems, since the users will have no training in how to adjust their speech for the benefit of the recognizer.

A speech recognition system must also offer real time operation with a given modest vocabulary. However, the Sphinx System still had some of the disadvantages of the prior speaker dependent recognizers in that it was programmed to operate on a single machine in a low noise environment using a microphone and a relatively constrained vocabulary. It was not designed for multi-user support, at least with respect to the different locations, and multiple vocabularies for recognition.

This invention overcomes many of the disadvantages of the prior art.

OBJECTS OF THE INVENTION

It is therefore an object of the present invention to provide a continuous speech speaker independent speech recognizer for a plurality of users in a distributed computer network environment.

It is another object of the invention to provide a speech recognizer having a large vocabulary of words with a minimum memory requirement.

It is another object of the invention to enable a plurality of voice applications to be recognized by the speech recognizer concurrently in the computer network or telephonically. The bandwidth reductions and noise introduced by telephone lines reduce the accuracy of all speech recognition systems. This effect increases with the size of the vocabulary that must be recognized at each moment in time. This makes the use of rapidly switchable speech recognition contexts crucial to this invention, so that individual contexts can be limited in size.

SUMMARY OF THE INVENTION

These and other objects are accomplished by speech recognition systems, architected on a client/server basis on a local area or wide area network. The speech recognition system is divided into a number of modules including a front end which converts the analog or digital speech data into a set of Cepstrum coefficients and vector quantization values which represent the speech. A back end uses the vector quantization values and recognizes the words according to phoneme models and word pair grammars as well as the context in which the speech made. By dividing the vocabulary into a series of contexts, situations in which certain words are anticipated by the system, a much larger vocabulary can be accommodated with minimum memory. As the user progresses through the speech recognition task, contexts are rapidly switched from a common database. The system also includes an interface between a plurality of user applications also in the computer network.

The system includes training modules, training and task build modules to train the system and to build the word pair grammars for the context respectively.

These and other objects, features and advantages will be more fully appreciated with reference to the accompanying Figures.

DETAILED DESCRIPTION OF THE INVENTION

Figure 1:
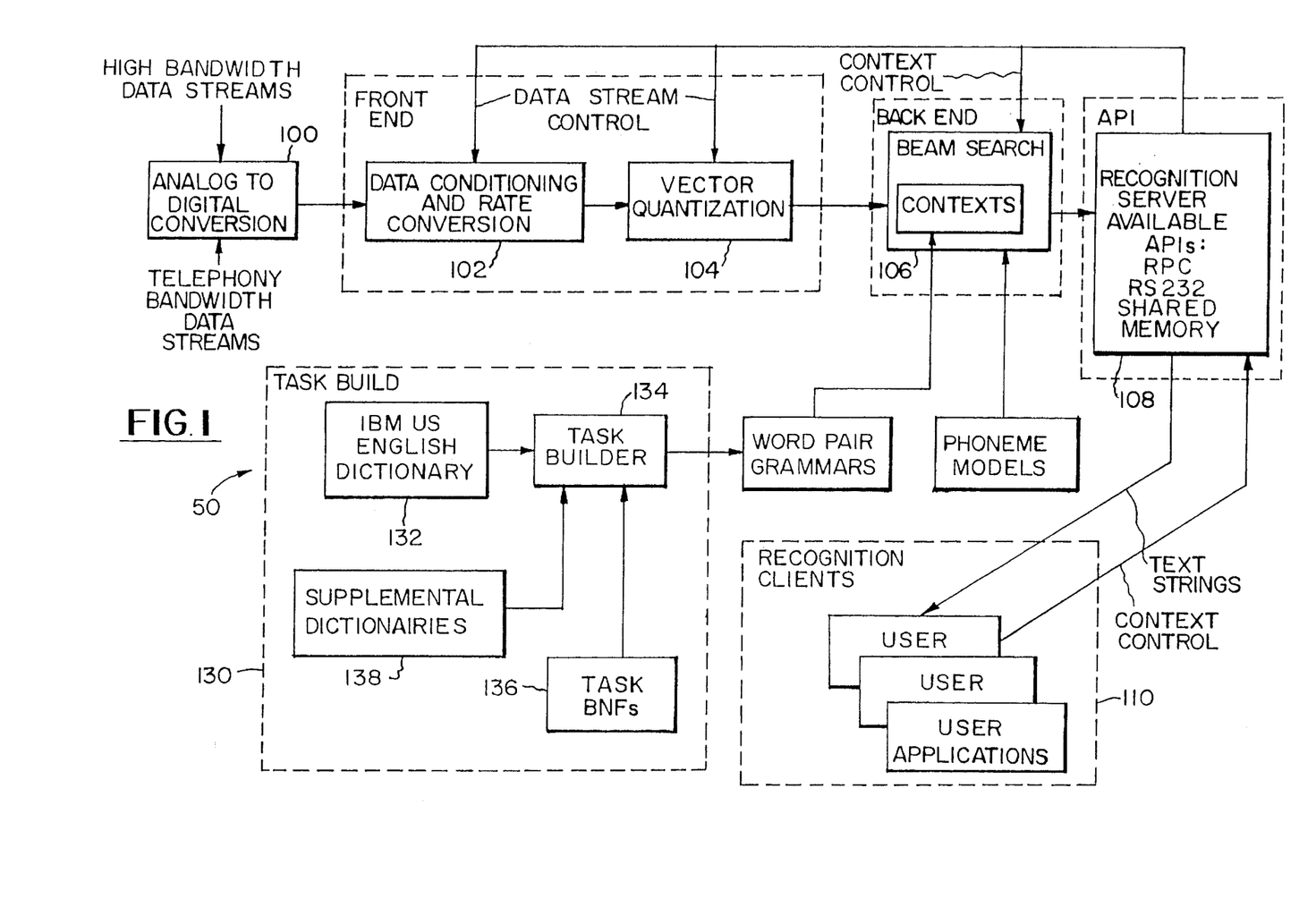
FIG. 1 illustrates the logical architecture of a continuous speech recognition system.

FIG. 1. illustrates the logical architecture of the IBM Continuous Speech Recognition System (ICSRS) independent of hardware configurations. At a broad level, ICSRS consists of components addressing the following areas:

o Data Acquisition —Data are converted from analog to digital form, or potentially demultiplexed from other channels in the case of telephonic data.

o Data Compression —The ICSRS Front End conditions, resamples, and compresses speech data streams to 300 bytes per second during the vector quantization step.

o Speech Recognition —The Back End performs the actual speech recognition by pattern matching phoneme models using a grammar-guided beam search algorithm. The phoneme models and word pair grammars together constitute the recognition contexts. Single or multiple instances of Back-End recognizers can be deployed either remotely or locally to the Front-End instances which acquire and compress the speech data.

o Task Building —The task building component allows the construction of recognition contexts off-line, compiles the word pair grammars for use at run time, and binds appropriate phoneme models to the task (context).

o Application Program Interface —The API offers RPC based recognition services which allow data stream control, context loading, and activation.

Either a high bandwidth voice data stream from a local microphone or a low bandwidth voice data stream, such as would be associated with telephony, is received by the Analog to Digital Conversion block 100. The Analog to Digital Conversion 100 can be performed by a hardware card such as the IBM M-Audio Capture and Playback Card (M-ACPA) card in the voice workstation. It has a digital signal processor which processes either the high bandwidth or telephony bandwidth signals and converts them to a series of digitally sampled data points. This conversion could also be performed by a digital PBX, and the telephony data streams provided in 8 KHz, 8-bit mu-law/a-law compressed format. For purposes of the present invention, high bandwidth is defined as being a sampling rate of 16 kilohertz or above. Low bandwidth is defined as 8 kilohertz or below which is what the general telephone system in the United States uses for digital voice. The A/D conversion block 100 is optional as in a telephone system the digital information could come in from a private phone exchange (PBX).

The first major block in the "front end" is the Data Conditioning and Rate Conversion (DCRC) block 102. The digitalized input from the A/D conversion 100 is at 44 or 8 kilohertz. A resampling technique is used as provided by the public literature in the IEEE [2]. The DCRC 102 samples and uses anti-aliasing filters on the digitized signal to create either a 16 kilohertz or 8 kilohertz data stream, for subsequent use. Both the DCRC and Vector Quantization processes are described in greater detail below and in the copending U.S. patent application Ser. No. 08/201,157, filed Feb. 24, 1994, which is a file wrapper continuation of Ser. No. 07/948,031 filed Sep. 21, 1992, and now abandoned, by N. F. Brickman, et al., entitled "Speech Recognition Techniques For Telephone Operation" assigned to IBM Corporation and incorporated herein by reference.

After data conditioning and rate conversion, the voice data is passed to the Vector Quantization block 104. In Vector Quantization, the digital data stream is segmented into Frames of one-fiftieth of a second duration, resulting in 320, 220, and 160 samples each at 16 KHz, 11 KHz, and 8 KHz sampling rates respectively. In one preferred embodiment, there are a hundred frames per second computed from any bandwidth speech signal, they are then over-lapped by fifty-percent, and have a Hamming window applied. The Hamming window is well defined in the public literature [3].

After the voice data stream is broken into frames, the vector quantization step extracts features from each frame. In the extraction portion of the vector quantization step, a series of parameters called the LPC Cepstrum Coefficients are calculated. The Cepstrum Coefficients extract and summarize some of the important characteristics of the speech for pattern recognition. In each frame of data, a fiftieth of a second of speech is encapsulated. One would expect to have fifty frames per second, however, there is fifty-percent overlap so a hundred frames per second are generated. To calculate the Cepstrum Coefficients, first a Hamming window, which is a cosine bell, is applied to the voice data. A Hamming window tapers the edges each frame of voice data to make the data extracted behave more like they would in an infinite duration continuous Fourier Transform.

The Hamming windowed frames are pre-filtered using a filter whose z-transform is $1.0-0.97*z^{-1}$, [1] page 49, in order to flatten the speech spectrum. Then 14 auto-correlation coefficients are computed. The auto-correlation coefficients are used to compute the Cepstrum coefficients in a manner well known in the public literature, described in [4]. Thirteen Cepstral coefficients are derived from the 14 auto-correlation coefficients. Other numbers of auto-correlation coefficients and dimensions of numbers of Cepstrum coefficients are possible. The statistical properties of these coefficients are used to guide the final vector quantization step.

Vector quantization is also used in the training process. The adjustment of the training data described below are crucial in enabling the base Sphinx recognition engine to operate over telephony equipment, and hence to the invention described herein. In the training process, a number of sentences are taken, currently between ten to fifteen thousand, and segmented into frames, from which auto-correlation and Cepstrum coefficients are calculated. A clustering procedure is applied to segregate the Cepstrum frame features into two hundred and fifty six classes using a k-means type clustering procedure, described in [5]. The centers of these Cepstrum clusters, and their class labels, taken together, are hereafter referred to as "codebooks."

For the final step of vector quantization, block 104 refers to a codebook derived in the training procedure, just described, to determine which cluster center is closest to the frame Cepstral coefficients. The current frame is then assigned to the class represented by that codebook value. Since there are 256 classes, the VQ value is represented by one byte. There are two other one-byte VQ values derived, from the differential Cepstrum, and the power in the frame. There are three one-byte VQ values derived one hundred times per seconds, resulting in a compression of the speech data stream to 2,400 bits per second.

The beam search (block 106) matches time series derived in the vector quantization, to word sequences from within the word pair grammars, defining each context. The Recognition Server communicates with user applications or Recognition Clients (block 110). The invention's architecture can have multiple front end (workstations) communicating to a single back end or multiple front ends communicating to multiple back ends.

The system is organized and implemented for different levels of operation. For communication networks with a very high data rate, the speech samples could be communicated directly to the system executing the back-end, for front end data compression. A plurality of raw digital speech data streams could be sent to the server containing the back end for multiple users. For a telephony system, multiple channels go to one back end, or multiple users come in to the front end and back end together.

The system is primarily organized around the speech recognition functions deployed as speech recognition servers. The system is guided by any one of a plurality of word pair grammars the application has chosen as the current context. The application has interfaces to the speech recognition system with Application Program Interface (API) calls supporting functions like initializing procedures, status codes and commands [6]. The application will request a certain type of operation or ask the recognition server to load a certain recognition context and to activate the context for recognition when required. The tasks are pre-loaded by the server, usually when the application is first executed. They are then sequentially activated, as required by the activity of the application program.

A set of API calls in the recognition server (block 108) allows user applications (block 110) to request the services of the speech recognition system. User application programs (block 110) can be running on the same computer or a different computer as the various components of the recognition server. If it is on the same computer, the application program (block 110) might interface with the recognition server through shared memory and semaphores, supported by the operating system. If the application program (block 110) and recognition server are on a different computers, communication can be arranged via an RS232 interface, or Remote Procedure Calls (RPC). RPC being well known in the programming literature [7].

Typical examples of user applications may include: Executive Information Systems, Database Access via verbal query, software problem reporting systems, and so forth.

Another example is a telephone answering voice response unit (VRU) which could call on the recognition server to take advantage of the its services. We have implemented versions of these servers on the RISC System 6000$^{(TM)}$ and PS/2$^{(TM)}$ with OS/2$^{(TM)}$.

The Direct Talk 6000$^{(TM)}$ is a similar telephony VRU system. In Direct Talk 6000$^{(TM)}$ rather than dealing with single telephone lines, the VRU system could require processing of a T1 line (with 24 conversation channels, possibly active simultaneously).

The recognition server architecture can handle multiple clients, as would be required to process such high-volume telephony applications as DirectTalk$^{(TM)}$.

The user applications can pre-register many contexts: a restaurants locator, a hard disk help desk, or a software help desk can all pre-register multiple contexts hierarchically. With each application, several users can be inputting speech streams. Each application will tell the recognition server to perform a recognition under a particular context for a particular speech stream, as appropriate for the task being executed.

In other words, multiple users dealing with the same API interface will register all their tasks, with one, or possibly several versions of the recognition server. The system arranges to avoid redundantly loading recognition tasks for multiple users, by checking if the requested task has already been loaded.

The task building (block 130) has several basic sources for its input. One is a U.S. English dictionary (block 132), which is a base dictionary with the pronunciations of twenty thousand words in it. The supplemental dictionary (block 138) is application specific, and allows for the addition of the pronunciation of words not found in the base dictionary. This would typically consist of proper nouns, acronyms, and the like, which a particular application requires for recognition.

The base U.S. dictionary (block 132) supplies words and the phoneme strings drawn on by the Task Builder (block 134). The Task Builder also draws on an appropriate task Baukus-Naur Form (BNF) grammar to determine what can be recognized by the speech server under the task, from the Task BNF library (block 136). For example, in an application which provides information on area restaurants, a first context may be the type of restaurant the caller wants, e.g., French, Italian, Chinese and a second context once the type was established would be the restaurants in that particular category. The task builder analyzes the BNF to find all the words that are required for the pattern matching and draws out the phoneme representation from the general U.S. dictionary (block 132). Inevitably, every particular application has its own sub-vocabulary which must be added to the system and these are stored in the supplemental dictionaries. For example, in a restaurant help desk, there are generic English words, such as: "Italian", "French", "Spanish", etc., which would be found in the standard U.S. dictionary. However, restaurant names, particularly in foreign languages, e.g., "Cherchez LesFemmes", "Chateau Voulez", but also unusual names for an American restaurant, e.g., J. J. Muldoon's, will not be in any normal dictionary, and must be added to the task supplemental dictionary (block 138). These supplemental dictionaries (block 138) can also contain local vocabulary that is in the base General English (block 132) dictionary which override the pronunciations.

The task builder (block 134) analyzes the input BNF grammar, and generates a grammar which is a list of each word in the grammar and a sub-list of all the words that can follow. Thus each word in the grammar has a list attached to it of legal following words and a pointer to the phoneme representation of each word, (called phoneme models in FIG. 1). The phoneme models are Hidden Markov Models of observing the various VQ values. The hidden Markov models are a group of discrete probability distributions, for the VQ values (as in block 104). These provide the probability of the occurrence of VQ values, given that the hidden Markov state machine is in a particular state within a phoneme. The public literature contains excellent descriptions of Hidden Markov Models in [8], as well as elsewhere.

The Beam Search (block 106) uses word models made of concatenated HMM phoneme models from a large table of context sensitive triphones which are generated during the training process. These are used to make an optimal estimate of the word sequence which best explains the observed sequence of VQ values. The beam searcher (block 106) uses the word grammars to select the phoneme models from which to construct the word models used in the search.

The user applications control the recognition server. For example, DirectTalk/2$^{(TM)}$ an IBM Program Product described in [9], could be a user application; it is able to answer the phone and perform restaurant locator functions. The restaurant locator application would use the DirectTalk/2$^{(TM)}$ system to indicate to the recognition server that it has sixteen contexts and issue a request to pre-load the contexts which are part of the Restaurant Locator help desk. As the application progresses, it requests the context switching of the recognition server. A user calls via the telephone for telephone help. The restaurant locator then requests the recognition server to perform a voice recognition under the first level context. Control and data are exchanged over the API between the recognition server, and the user application. Multiple instances of the DirectTalk/2$^{(TM)}$ system could use the same recognition server.

The speech recognition server acquires speech data until a (user adjustable, but most commonly 0.6 seconds) period of silence. Recognition is terminated when this period is observed, and it is assumed that the person is done speaking.

Figure 2:
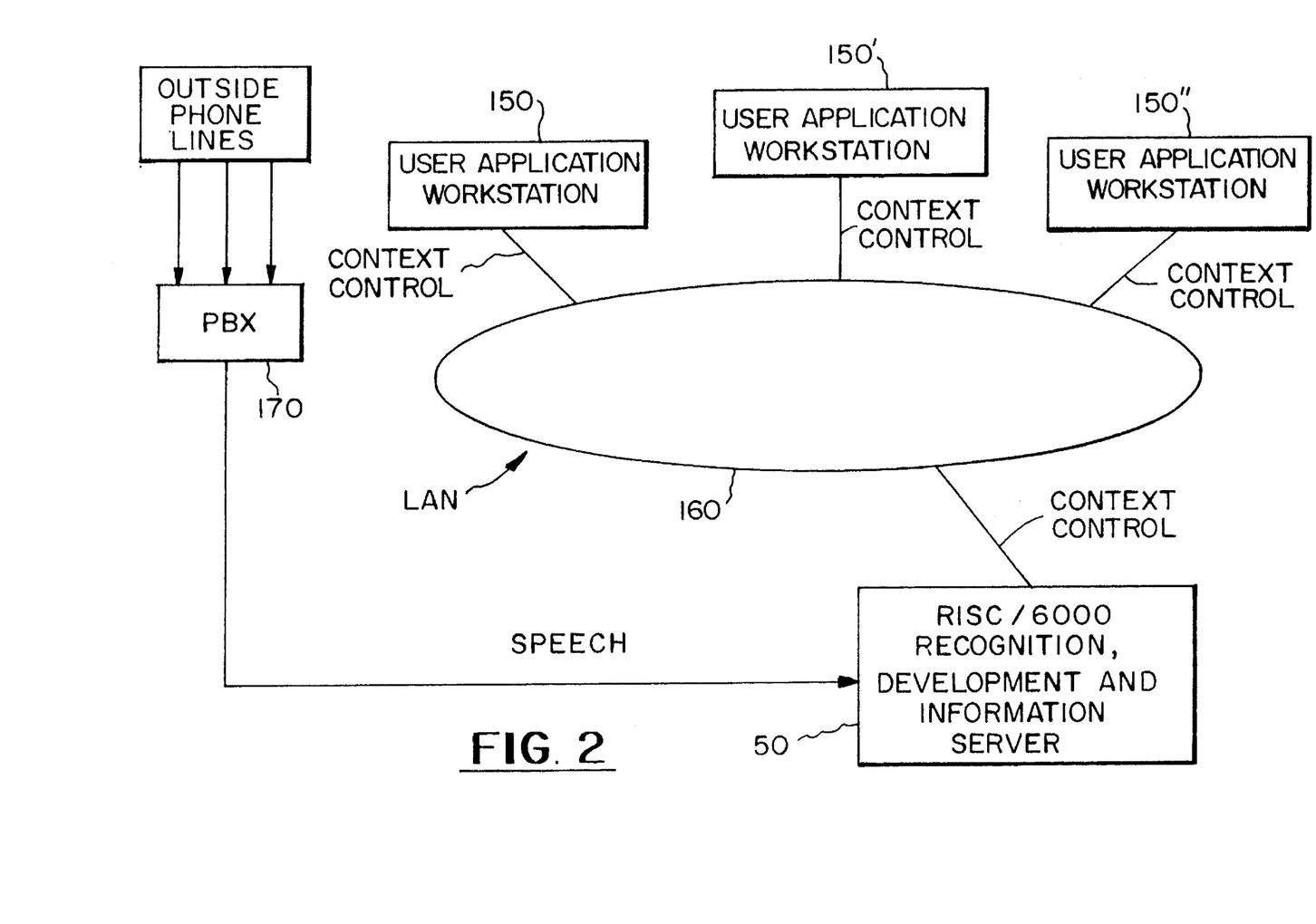
FIG. 2 is a block diagram of a network for recognition server operating in a telephony customer service call center.

The speech recognition system described herein, is architected to allow multiple deployments, on multiple hardware platforms, and multiple software configurations. For example, one possible architecture is shown in FIG. 2, which provides a physical mapping of the logical architecture 50, discussed above, onto a physical implementation of workstations 150, 150', 150" connected via a local area network 160. Each workstation in this architecture can run multiple independent user applications, and each is master to the recognition server 50 as a slave processor. The PBX 170 is connected to outside telephone lines and delivers a telephony bandwidth data stream to the analog/digital conversion 100 of the recognition server 50, shown in FIG. 1. The text representing recognized speech is returned from the recognition server to the user applications.

INSTANTANEOUS CONTEXT SWITCHING FOR SPEECH RECOGNITION SYSTEMS

A speech recognition system that is based on the use of discrete Hidden Markov Models (HMM's), such as the Sphinx system of Carnegie Mellon University [1], requires a large amount of memory dedicated to the storage of the HMM's. With this type of system that also expands the use of HMM's to generalized triphones as well as function words, there can result in more than 1000 HMM's that need be accessible for construction and use in particular tasks. With a multiplicity of codebooks and the phoneme modeling complexity as used in Sphinx, it is not unusual for each HMM to require close to 10,000 bytes of storage.

A practical implementation of HMM-based speech recognition will often consider system operational parameters such as speaker dependence/independence, isolated word/ continuous speech, vocabulary size, and the need for language modeling when architecting and building an operational system. Performance and functional demands on an actual operational system will usually put stringent demands on the computer system(s) used for implementation, including response time requirements that mandate the HMM's to be available in fast system memory for speedy access. For complex tasks that might require 1000 HMM's, real-memory storage requirements of 10 MBytes (1000×10,000) for just the HMM's in a single task are the result since the recognition decision-making process is so closely coupled to the statistical information contained in the HMM's.

A given application with speech recognition for the user interface will in turn often involve many tasks to comprise its complete environment. This puts a system requirement to have fast switching from one task (or "context") to another. And if further a single computer system will be providing speech recognition services (like a server) to multiple clients (or users) then the demands for having a fast context (or task) switching become even more critical. Moving task models that have closely coupled with them large amounts of HMM's into and out of fast storage puts stringent performance demands on practical systems. Or pre-loading all possible tasks into memory would greatly increase the overall real memory requirements for the computer system.

Figure 3:
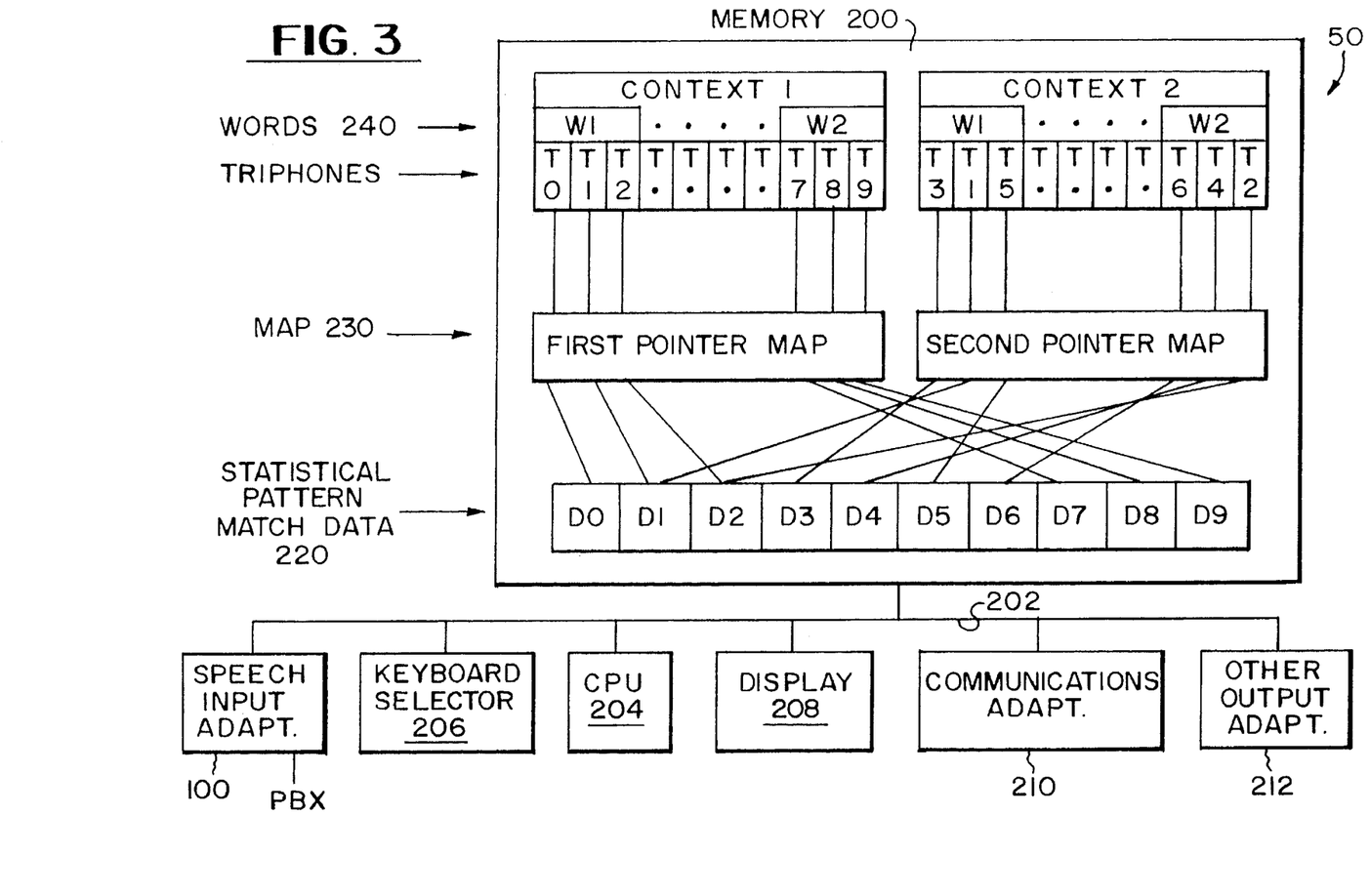
FIG. 3 is more detailed block diagram of the instantaneous context switching speech recognition system, in accordance with the invention.

The functional block diagram of FIG. 3 depicts the instantaneous context switching recognition system, in accordance with the invention. The system 50 includes a memory 200 connected by means of the bus 202 to the CPU 204. Also connected to the bus 202, is a speech input adapter 100 which connects the PBX 170 to the instantaneous context switching speech recognition system 50. Also connected to the bus 202, is a keyboard selector 206 and a display 208. In addition, a communications adapter 210 is connected to the bus 202 and is also connected to the LAN 160. Still further, other output adapters 212 can also be connected to the bus 202.

In the invention disclosed herein, the above problem is solved by loading all possible HMM's into memory 200 in one block (one time) (see 220 in FIG. 3), as opposed to building individual recognition modules associated with each task that each carries the HMM information required for that task (with associated duplication of HMM's). In the speech recognition system disclosed herein, each task is guided by a simple language model, so the recognition module for each task includes network information for the legal syntax of phoneme transitions but not the memory associated with its required HMM's. For access to the statistical HMM information an additional level of indirection is built in with memory pointers 230 as described below. The HMM's are put into memory only once (220) in a single file, and each context or task (240) shares from the common pool.

At task building time, offsets (or mapping vectors 230) are calculated and stored along with the task recognition load module for each required HMM that identifies the relative location of the HMM in the file that contains the total group of all HMMs 220 that have been trained and are available for use by individual tasks (approximately a 10 MByte file using the sample numbers given) rather than actually storing the HMM's themselves. During actual system operation, applications arrange for the pre-storing of all tasks (240) and maps (230) they might require. Then when a particular application requires and gets the focus of the recognition engine for recognition with a particular task, the requested task search network is engaged by a simple assignment of one of several base pointers. The offsets 230 provided within the network in turn provide access to the actual HMM's.

Compared to the time that would be needed to load large search networks into memory upon demand, the context switching taught by this invention can be considered to be near-instantaneous. And if a speech recognition system were to pre-load into real memory a suitably large number of context or tasks (240) for which recognition is to be required, this invention provides for a large savings in the amount of real memory required.

The memory 200 in FIG. 3 is connected to the CPU 204, and program instructions stored in the memory 200 will be executed in the CPU 204.

A first partition in the memory 200 includes the context 1, also known as task 1, which includes a first plurality of words, W1, W2, etc. Each of the words in context 1 has a second plurality of phonemes. The phonemes are organized as triphones in the memory 200 of FIG. 3. For example, in context 1, W1 has the phonemes T0, T1 and T2. They may also be characterized as triphones.

A second context partition is included in the memory 200 of FIG. 3, this being context 2. Context 2 includes a third plurality of words, W1, W2, etc., which are generally different from the plurality of words in context 1 of FIG. 3. The third plurality of words in context 2 includes a fourth plurality of phonemes. The phonemes can also be represented as triphones. For example, in context 2, W2 has three phonemes, T6, T4 and T2.

A statistical pattern matching partition 220 is also included in the memory 200 and it includes a fifth plurality of phoneme pattern matching data units, D0–D9.

In accordance with the invention, a first pointer map is included in the memory 200 of FIG. 3. The first pointer map includes a second plurality of pointers, each of which relates a respective one of the second plurality of phonemes in context 1 to a respective one of the fifth pattern matching data units. For example, in context 1, the word W1, includes the phoneme T0 and the first pointer map in map 230 relates T0 to the statistical pattern match data D0.

Further, in accordance with the invention, the map 230 also includes a second pointer map which includes a fourth plurality of pointers, each of which relates a respective one of the fourth plurality of phonemes in context 2 to a respective one of the fifth plurality of pattern matching data units 220. For example, the context 2 word W2 has the phoneme T2 which is related by the second pointer map in map 230, to the statistical pattern match data D2.

Also shown in FIG. 3, is the keyboard selector 206 which is connected through the bus 202 to the memory 200. The keyboard selector 206 selects either the first context partition, context 1, and the first pointer map or alternately it selects the second context partition, context 2, and the second pointer map. This selection is performed to convert speech input information received from the speech input adapter 100 into character string information which is then output to either the display 208, the communications adapter 210, or the other output adapters 212.

In this manner, the context of a speech recognition application can be changed from context 1 to context 2 without loading new pattern matching data units 220 into the memory 200.

TRAINING PROCESS

The training procedure uses a large library of known utterances and their textual transcripts, to estimate the parameters of the phonemes HMMs used in pattern matching of word models to text in the beam search process.

First, the transcripts are used to retrieve the phonemes, representing the pronunciation of the words in the training set, from the General English dictionary.

Next the parameters of phoneme HMMs are estimated in the context of preceding, and following phonemes (called triphones), to provide for effective estimation of coarticulation effects. The estimation procedure used is the Baum-Welch Forward/backward iteration algorithm described in [8]. The parameters of the HMMs are iteratively adjusted so as to maximize the probability that the trained triphone HMMs would have generated the time series of VQ values observed in the training set.

There are many parameters for every hidden Markov phoneme model, there being 7 states and 12 transition arcs in each hidden state machine. Associated with each transition arc are associated 256 discrete elements in the probability distribution for each of the three codebooks. The triphone HMMs parameters that result from the training procedure are clustered sharply to reduce the number of triphones required to adequately represent the coarticulation effects present in continuous speech.

While the invention has been described with reference to a preferred embodiment, it will be understood by those skilled in the art that various changes can be made to the architecture without departing from the spirit and scope of the invention. Accordingly, the invention shall be limited only as specified in the following claims.

References Describing Related Work and Materials

[1] "Large Vocabulary Speaker and Dependent Continuous Speech Recognition: The Sphinx System"; Kai-Fu Lee; Cargnie Mellon University, Department of Electrical and Computer Engineering; April 1988; CMU-CS-88-148

[2] "A General Program to Perform Sampling Rate Conversion of Data by Rational Ratios"; from "Programs for Digital Signal Processing", Ed.: Digital Signal Processing Committee of the IEEE Acoustics, Speech, and Signal Processing Society; IEEE Press, 1979; Section 8.2, pp 8.2-1 to 8.2-7 by R. E. Crochiere

[3] "Theory and Application of Digital Signal Processing" L. R. Rabiner, B. Gold; Prentice Hall, 1975, pp 91

[4] "Digital Processing of Speech Signals"; Prentice Hall Signal Processing Series; 1978, pp 401–402, 411–413

[5] "An Algorithm for Vector Quantizer Design"; Y. Linde, A. Buzo, R. Gray, IEEE Transactions on Communications, Vol. com-28, no. 1, January 1980

[6] "IBM Continuous Speech Recognition System Programmers Guide"; B. Booth; 1992; currently unpublished, available on request.

[7] "AIX Distributed Environments: NFS, NCS, RPC, DS Migration, LAN Maintenance and Everything"; IBM International Technical Support Centers, Publication GG24-3489, May 8, 1990

[8] "A Tutorial on Hidden Markov Models and Selected Applications in Speech Recognition"; L. Rabiner; Readings in Speech Recognition; Ed.: A. Waibel, K. Lee; Morgan Kaufmann; 1990; pp 267–296

[9] "IBM CallPath DirectTalk/2 General Information and Planning Manual"; International Business Machines publication no. GB35-4403-0; 1991

[10] "A Maximum Likelihood Approach to Continuous Speech Recognition"; L. R. Bahl, F. Jelinek, R. Mercer; Readings in Speech Recognition; Ed.: A. Waibel, K. Lee; Morgan Kaufmann; 1990; pp 308–319

We claim:

1. In a speech recognizer for multiple contexts and a plurality of users, an instantaneous context switching system, comprising:

a memory coupled to a data processing means, a speech input means coupled to the plurality of users for speech recognition purposes and an output character string utilization device;

a first context partition in said memory including a first plurality of words, each said first plurality of words including a second plurality of phonemes;

a second context partition in said memory including a third plurality of words, each said third plurality of words including a fourth plurality of phonemes;

a pattern matching partition in said memory including a fifth plurality of phoneme pattern matching data units for sharing by both contexts;

a first pointer map including a second plurality of pointers, each respective one of said second plurality of phonemes related to a respective one of said of fifth pattern matching data units;

a second pointer map including a fourth plurality of pointers, each respective one of said fourth plurality of phonemes related to a respective one of said fifth plurality of pattern matching data units; and selection means coupled to said memory either for selecting said first context partition and said first pointer map or alternately for selecting said second context partition and said second pointer map, for converting speech input information received from said speech input means into character string information output to said character string utilization device using the shared phoneme pattern matching data units for both contexts;

whereby, a context of a speech recognition application can be instantaneously changed without loading new pattern matching data units in said memory.

2. The system of claim 1 which further comprises:

said second plurality of phonemes being represented by triphones and said fourth plurality of phonemes being represented by triphones;

said pattern matching data units performing triphone pattern matching.

3. In a speech recognizer for multiple contexts and a plurality of users, a method for instantaneous context switching comprising the steps of:

loading a first plurality of words into a first context partition in a memory in said speech recognizer, said first plurality of words including a second plurality of phonemes;

loading a third plurality of words in a second context partition in said memory, each said third plurality of words including a fourth plurality of phonemes;

loading a fifth plurality of phonemes pattern matching data units in a pattern matching partition in said memory for sharing by both contexts; loading a first pointer map in said memory including, a second plurality of pointers, each respective one of said second plurality of phonemes related to a respective one of said fifth plurality of shared pattern matching data units;

loading a second pointer map into said memory, including a fourth plurality of pointers, each respective one of said fourth plurality of phonemes related to a respective one of said fifth plurality of said shared pattern matching data units;

providing a voice input for speech recognition purpose from one of a plurality of users of the speech recognizer; and selecting either said first context partition and said first pointer map or alternately selecting said second context partition and said second pointer map using the shared phoneme pattern matching data units for both contexts;

whereby, a context of a speech recognition application can be instantaneously changed without loading new pattern matching data units in said memory.

4. The method of claim 3 which further comprises:

said second plurality of phonemes being represented by a plurality of triphones and said fourth plurality of phonemes being represented by a plurality of triphones;

said pattern matching data units contributing to matching triphones.

5. A speech recognition system for multiple contexts and multiple users comprising:

a memory containing a plurality of contexts, each context containing a plurality of words, each word having a plurality of phonemes;

a plurality of phoneme pattern matching data units stored in the memory for sharing by all contexts;

a plurality of pointer maps stored in the memory, each map linking all phonemes in a context to the phoneme pattern data units;

a speech input adapter for receiving speech input from a user;

selection means coupled to the memory for selecting a context and a pointer map in response to a speech input of one or more words in a context, the pointer map coupling the phonemes for each word in the context to the phoneme pattern matching data units to recognize and convert the speech input into character string information using the shared phoneme pattern matching data units for all contexts; and an output adapter for presenting the recognized speech.

6. The speech recognition system of claim 5 further including a communications adapter for coupling the system into a network including other speech recognitions systems to allow multiple deployments of user applications on multiple systems.

7. A speech recognition system comprising:

speech input means for generating a series of vector quantization values (VQ) indicative of speech input;

means for generating multiple word grammars as contexts, each context related to a user application;

a speech recognition unit for matching word sequences in a context to the series of VQ values in the speech input comprising:

means coupling the speech input means, a processor, and an output device to a memory;

a plurality of the contexts stored in the memory, each context containing a plurality of words represented by phonemes;

a phoneme pattern matching unit stored in the memory for sharing by all contexts in the speech recognition unit;

a plurality of pointer maps stored in the memory, each pointer map coupled to a different context, each pointer in a map relating a phoneme in a word to a phoneme in the pattern matching unit;

stored program instructions in the memory for operating the processor to match the VQ values in the speech input to the words stored in the context and generating character strings representative of the speech input as an output in the output device; and means for instantaneously switching the speech recognition unit from one context to another context without changing the phoneme pattern matching units.

8. The system of claim 7 further comprising a communications adapter for coupling the system to multiple stations in a network, each station including the speech recognition unit.

9. The system of claim 8 wherein the phonemes are Hidden Markov Models.

10. The system of claim 9 further including a recognition server to enable a user to request the services of a speech recognition unit for an application running on the processor or running on a different processor on the network.

11. The system of claim 10 including means for continuous speech independent recognition.

12. The system of claim 11 including means to reduce the storage capacity of the memory.

13. In a continuous speech recognition system for recognizing input speech in different contexts, a front end for receiving the speech related to the contexts, a speech recognition unit including a processor and a memory for generating character strings representative of the speech input, a method of speech recognition comprising the steps of:

storing in the memory a plurality of contexts of words, each word represented by at least one phoneme;

storing in the memory a plurality of phoneme pattern matching units for sharing by all contexts;

storing in the memory pointer maps, each pointer map relating phonemes in the words to phonemes in the phoneme pattern matching units;

storing in the memory program instructions for operating the processor;

operating the processor using the stored program instruction to match the speech input to the words in the context using the shared phoneme pattern matching units;

generating character strings as an output from the system from the matched speech input and words in the context; and instantaneously switching the system to another context stored in the memory without changing the phoneme pattern matching units.

14. The method of claim 13 wherein each phoneme is represented by a triphone.

15. The method of claim 14 further comprising the step of:

generating a series of vector quantization values representative of the speech input.

16. The method of claim 15 further comprising the step of:

operating a selection device to instantaneously switch the system from one context to another.

17. The method of claim 16 further comprising the step of;

storing at least one user application in a recognition server for a plurality of speech recognition units in a network to enable the applications to be recognized concurrently in the network.

18. The method of claim 17 wherein the speech recognition unit is speaker independent.

19. The method of claim 18 wherein the different contexts form a vocabulary of words in which certain words are anticipated by the speech recognition unit.

* * * * *